US012100114B1

(12) United States Patent
Karumuri et al.

(10) Patent No.: US 12,100,114 B1
(45) Date of Patent: Sep. 24, 2024

(54) VIRTUAL SHOE TRY-ON

(71) Applicant: Amazon Technologies, Inc., Seattle, WA (US)

(72) Inventors: Gitika Karumuri, Santa Clara, CA (US); Yuelong Li, Santa Clara, CA (US); Sunil Sharadchandra Hadap, Dublin, CA (US); Ashwin Swaminathan, Dublin, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/744,444

(22) Filed: May 13, 2022

(51) Int. Cl.
*G06T 19/20* (2011.01)
*G06Q 30/0601* (2023.01)
*G06T 7/70* (2017.01)
*G06T 11/00* (2006.01)
*G06V 10/70* (2022.01)
*G06V 40/10* (2022.01)

(52) U.S. Cl.
CPC ......... *G06T 19/20* (2013.01); *G06Q 30/0643* (2013.01); *G06T 7/70* (2017.01); *G06T 11/00* (2013.01); *G06V 10/70* (2022.01); *G06V 40/10* (2022.01); *G06T 2207/20081* (2013.01); *G06T 2207/30196* (2013.01); *G06T 2219/004* (2013.01); *G06T 2219/2016* (2013.01)

(58) Field of Classification Search
CPC .. G06T 19/20; G06T 11/00; G06T 2219/2016
See application file for complete search history.

(56) References Cited

U.S. PATENT DOCUMENTS

| | | | |
|---|---|---|---|
| 2007/0273711 A1 | 11/2007 | Maffei | |
| 2015/0199816 A1 | 7/2015 | Freeman et al. | |
| 2018/0253906 A1* | 9/2018 | Tran | A43B 3/34 |
| 2020/0000180 A1 | 1/2020 | Sherrah et al. | |
| 2021/0125405 A1* | 4/2021 | Tran | A61B 5/0205 |
| 2022/0101417 A1* | 3/2022 | Boscolo | G06Q 30/0641 |

OTHER PUBLICATIONS

Chou et al.; PIVTONS: Pose invariant virtual try-on shoe with conditional image completion; Computer Vision-ACCV 2018: 14th Asian Conference on Computer Vision; Perth, Australia, Dec. 2018 pp. 654-668.
Shan et al.; ARShoe: Real-time augmented reality shoe try-on system on smartphones; Proceedings of the 29th ACM International Conference on Multimedia. 2021; Oct. 2021; pp. 1111-1119.

* cited by examiner

*Primary Examiner* — Matthew Salvucci
(74) *Attorney, Agent, or Firm* — K&L Gates LLP

(57) ABSTRACT

The present disclosure describes a system and method for implementing a virtual shoe try-on feature. The method includes receiving, from a database, a three-dimensional model of a shoe with a first annotated point on the three-dimensional model of the shoe, a second annotated point on the three-dimensional model of the shoe, and a third annotated point on the three-dimensional model of the shoe. The method also includes predicting, using a machine learning model and based on an image of a foot, one or more features of the foot, generating, based on the first annotated point, the second annotated point, the third annotated point, and the one or more features, a two-dimensional model of the shoe using the three-dimensional model of the shoe, and superimposing the two-dimensional model of the shoe onto the image of the foot.

16 Claims, 9 Drawing Sheets

VIRTUAL SHOE TRY-ON

BACKGROUND

The present disclosure relates to shoes, and more specifically, to fitting shoes on a person's feet. One challenge of purchasing shoes online is that a user may not have the opportunity to test the shoes on the user's feet before purchasing, and thus, it may be difficult to find shoes that are a good fit on the user's feet.

DETAILED DESCRIPTION

Figure 1:
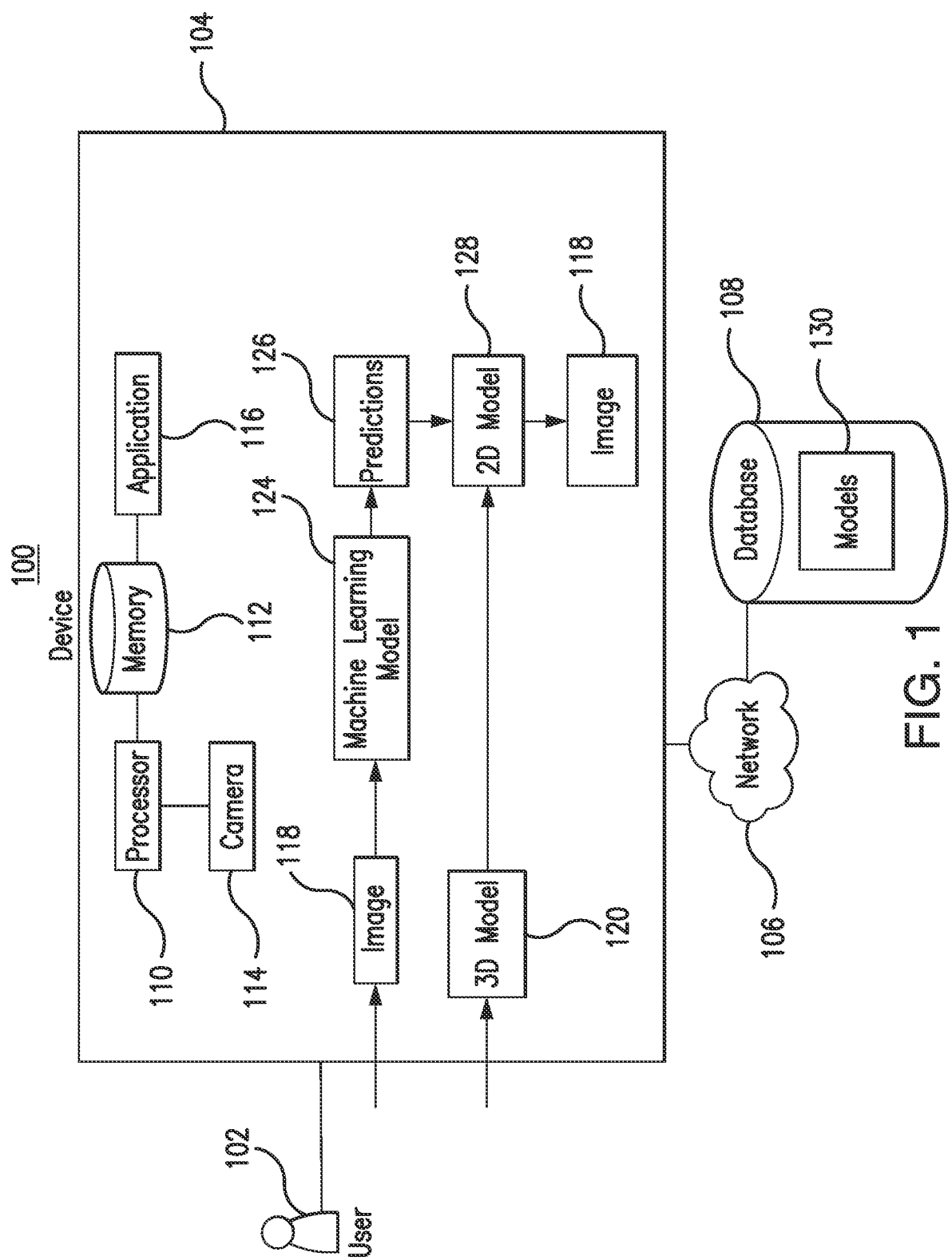
FIG. 1 illustrates an example system.

The present disclosure describes a virtual shoe try-on feature that allows a user to see how a shoe will look on the user's foot before the user purchases the shoe. The virtual shoe try-on feature uses machine learning to predict how a shoe will fit onto an image of the user's foot (e.g., a frame of a video of the user's foot). The feature then generates and superimposes a two-dimensional (2D) model of the shoe onto the image to show the user how the shoe will look on the user's foot. In this manner, the user may see the shoe superimposed onto the user's foot in a video concurrently captured by the user's mobile device.

The feature processes a three-dimensional (3D) model of a shoe to generate the 2D model. A challenge that arises is that the 3D models of different shoes may be generated by different shoe providers or modelers who do not use the same coordinate system and who do not adhere to a standard or uniform way of generating and presenting the 3D models. As a result, the 3D models for different shoes may be generated using different coordinate systems and may not be of a uniform size, orientation, or position. There are inconsistencies between 3D models of different shoes that make it difficult for the virtual shoe try-on feature to implement a uniform process for simulating the look and fit of the shoes on a user's foot.

The present disclosure describes various processes to account for the inconsistencies between 3D models of different shoes. Generally, when the 3D models are generated, the creator of the 3D models annotates several points on the 3D models. For example, the creator may annotate a point on the heel of the insole of the shoe, another point on the insole that would contact the protrusion of the first metatarsophalangeal joint of a foot (e.g., the protrusion on the side of the foot at the base of the big toe), and another point on the insole that would contact the protrusion of the fifth metatarsophalangeal joint of the foot (e.g., the protrusion on the side of the foot at the base of the little toe). These annotated points are then used to scale and translate the 3D model. It is understood that these processes or similar processes may be used in any virtual try-on process and are not limited to virtual try-on processes involving shoes.

In a first process, the annotated points on a 3D model are considered with keypoints on the foot. These keypoints may have been predicted from an image of the foot. The keypoints may be positioned at the heel of the foot, at the protrusion of the first metatarsophalangeal joint, and at the protrusion of the fifth metatarsophalangeal joint. The 3D model may be scaled and translated so that the annotated points on the 3D model align with the keypoints on the foot. As a result, the 3D model is sized to fit onto the foot, in certain embodiments.

In a second process, if the keypoints for the foot are not available, then the 3D model is processed (e.g., transformed) so that the annotated points on the 3D model align with annotated points on a standard sized model (e.g., a model of a size 9 shoe). In this manner, the 3D model is aligned with a standard that is uniform across different shoes. The virtual shoe try-on feature then scales and orients the processed 3D model to fit on the foot.

FIG. 1 illustrates an example system 100. As seen in FIG. 1, the system 100 includes a device 104, a network 106, and a database 108. Generally, the system 100 implements a virtual shoe try-on feature that allows a user 102 to see how a shoe would fit on the user's 102 foot before purchasing the shoe. The system 100 uses machine learning to generate a virtual model of a shoe based on a captured image of the user's 102 foot. The system 100 then superimposes the model of the shoe onto the image of the user's 102 foot to simulate the fit of the shoe on the user's 102 foot.

The device 104 may be a personal device of the user 102, such as, for example, a mobile phone or a laptop of the user 102. The user 102 uses the device 104 to shop for shoes online. When the user 102 finds a pair of shoes that the user 102 likes, the user 102 may use the virtual shoe try-on feature implemented by the device 104 to simulate the look and fit of the shoe on the user's 102 foot. As see in FIG. 1, the device 104 includes a processor 110, memory 112, and camera 114 that perform the actions and functions of the device 104.

The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102.

The processor 110 is any electronic circuitry, including, but not limited to one or a combination of microprocessors, microcontrollers, application specific integrated circuits (ASIC), application specific instruction set processor (ASIP), and/or state machines, that communicatively couples to memory 112 and controls the operation of the device 104. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on the memory 112 to perform any of the functions described herein. The processor 110 controls the operation and administration of the device 104 by processing information (e.g., information received from the database 108, network 106, and memory 112). The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application 116 executable by the processor 110 to perform one or more of the functions described herein.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The database 108 stores one or more models 130 of shoes that are available for purchase. In some embodiments, the database 108 stores three-dimensional (3D) models 130 of shoes. When the user 102 uses the device 104 to indicate that the user 102 would like to virtually try on a shoe, the device 104 communicates a query to the database 108 to retrieve the model 130 for that shoe. When the database 108 receives the query, the database 108 retrieves the model 130 of the desired shoe and communicates that model to the device 104 over the network 106. The device 104 may then process that model to simulate the look and fit of the shoe on the user's 102 foot.

The camera 114 captures an image or a series of images (e.g., a video) that is used or processed by the device 104. In some embodiments, the user 102 uses the device 104 to capture an image or a series of images of the user's 102 foot that is used for the virtual shoe try-on feature.

The device 104 executes an application 116 to implement one or more features of the device 104. For example, the application 116 may be a shopping application that the user 102 uses to shop for shoes online. The application 116 may also perform the virtual shoe try-on feature when instructed by the user 102. In some embodiments, the memory 112 stores the application 116, and the processor 110 executes the application 116 to perform one or more of the features or functions described herein.

In an example operation, the user 102 uses the device 104 to shop for shoes online. The user 102 may see a style of shoe that the user 102 likes, but the user 102 may not know what size shoe to purchase or how the shoe will look on the user's 102 foot. The user 102 may rely on the virtual shoe try-on feature to simulate the look and feel of the desired shoe on the user's 102 foot before purchasing the shoe.

When the user 102 indicates that the user 102 wants to use the virtual shoe try-on feature, the device 104 may request the user 102 use the device 104 to capture an image 118, or series of images 118, of the user's 102 foot. The user 102 may use the camera 114 of the device 104 to capture the image 118 of the foot. For example, the user 102 may direct the camera 114 at the user's 102 foot to capture the image 118 of the user's 102 foot. The image 118 may be of the user's 102 foot in any suitable state. For example, the image 118 may show the user 102 wearing a shoe over the foot. As another example, the image 118 may show the user 102 wearing a sock over the foot. As yet another example, the image 118 may show an exposed or unclothed foot. The device 104 also communicates a query to the database 108 over the network 106. When the database 108 receives the query, the database 108 retrieves a 3D model 120 of the desired shoe, and communicates that model 120 to the device 104.

The device 104 applies a machine learning model 124 to the image 118 of the user's 102 foot to make predictions 126 of different aspects of the foot. The device 104 uses the predictions 126 and the 3D model 120 of the shoe to simulate the look and fit of the shoe on the user's 102 foot.

The device 104 uses the predictions 126 to generate a two-dimensional (2D) model 128 of the shoe from the 3D model 120 of the shoe. For example, the device 104 may rotate the 3D model 120 of the shoe to align the 3D model 120 of the shoe with the user's 102 foot in the image 118. As another example, the device 104 may resize or scale the 3D model 120 of the shoe so that the 3D model 120 of the shoe fits over the user's 102 foot shown in the image 118. As yet another example, the device 104 may remove portions of the 3D model 120 of the shoe that would be occluded by other objects in the image 118 (e.g., the user's 102 leg). The device 104 may then flatten the 3D model 120 of the shoe to generate the 2D model 128 of the shoe. As a result, the 2D model 128 of the shoe may be a projection of the 3D model 120 of the shoe onto a 2D plane. The device 104 then simulates the look and fit of the shoe on the user's 102 foot by superimposing the 2D model 128 of the shoe onto the user's 102 foot shown in the image 118. The device 104 then displays the image 118 with the superimposed 2D model 128 of the shoe so that the user 102 may see how the shoe would look and fit on the user's 102 foot. The user 102 may then make a more informed decision when purchasing the shoe.

The 3D models 130 in the database 108 may be generated by different shoe providers or modelers. Consequently, the models 130 for different shoes may not conform to the same coordinate system. Additionally, the models 130 for different shoes may be different sizes or start with different orientations or at different positions. These differences in the models 130 make it difficult for the device 104 to determine how to properly scale and position the 3D model 120 retrieved for any requested shoe, which may result in inaccurate simulations of the look and fit of the shoe on the user's 102 foot.

In certain embodiments, to address this issue, the shoe providers or modelers annotate certain points on the models 130 of the shoes that serve as reference points for the device 104. For example, the shoe providers or modelers may annotate a point on the heel of the insole of the shoe, another point on the insole that would contact the protrusion of the first metatarsophalangeal joint of a foot (e.g., the protrusion on the side of the foot at the base of the big toe), and another point on the insole that would contact the protrusion of the fifth metatarsophalangeal joint of the foot (e.g., the protrusion on the side of the foot at the base of the little toe). The shoe providers or modelers may annotate any suitable number of points on the models 130 of the shoes (e.g., points on the top of the shoe or on the bottom of the shoe). These points may be selected and used to remove the subjectivity of the shoe producer or modeler when simulating the look and fit of the shoe on a foot.

The device 104 uses these annotated points as reference points to properly align a 3D model 120 of a shoe with the foot in the image 118 based on the predictions 126. For example, the predictions 126 may include predicted keypoints indicating certain locations on the foot (e.g., the heel, the protrusion of the first metatarsophalangeal joint, and the protrusion of the fifth metatarsophalangeal joint). The device 104 may scale and translate the 3D model 120 to align the annotated points with the predicted keypoints on the foot. The device 104 then generates the 2D model 128 from the 3D model 120. As another example, the device may scale and translate the 3D model 120 to align the annotated points with annotated points on a standard model of a shoe (e.g., a model of a size 9 shoe at a standard position or orientation). This process sets the 3D model 120 to a standard size, position, or orientation. The device 104 then uses the predictions 126 and the standardized 3D model 120 to generate the 2D model 128. In this manner, the device 104 improves the accuracy of the simulated look and fit of the shoe on the user's 102 foot. As a result, the device 104 improves the satisfaction of the user 102 and reduces material waste caused by returns, which conserves shipping resources, such as packaging materials and fuel, in particular embodiments.

Figure 2:
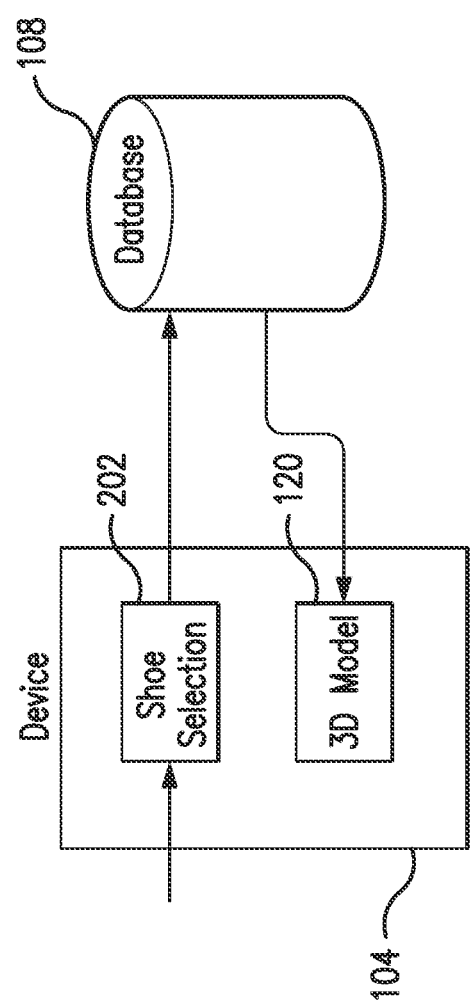
FIG. 2 illustrates an example device and database in the system of FIG. 1.

FIG. 2 illustrates an example device 104 and database 108 in the system 100 of FIG. 1. As seen in FIG. 2, the device 104 receives a shoe selection 202. For example, the device 104 may receive the shoe selection 202 when the user 102 selects a shoe that the user 102 wants to virtually try on. The device 104 may communicate the shoe selection 202 to the database 108. In some embodiments, the shoe selection 202 includes an identifier for the shoe that the user 102 desires. For example, the shoe selection 202 may include a name or model number of the desired shoe. The device 104 may communicate the shoe selection 202 to the database 108 as a query.

The database 108 uses the shoe selection 202 to query information stored in the database 108. Using the information in the shoe selection 202, the database 108 retrieves the 3D model 120 of the desired shoe, and communicates the 3D model 120 of the desired shoe to the device 104. The device 104 then processes the 3D model 120 of the shoe to simulate the look and fit of the shoe on the user's 102 foot.

Figure 3:
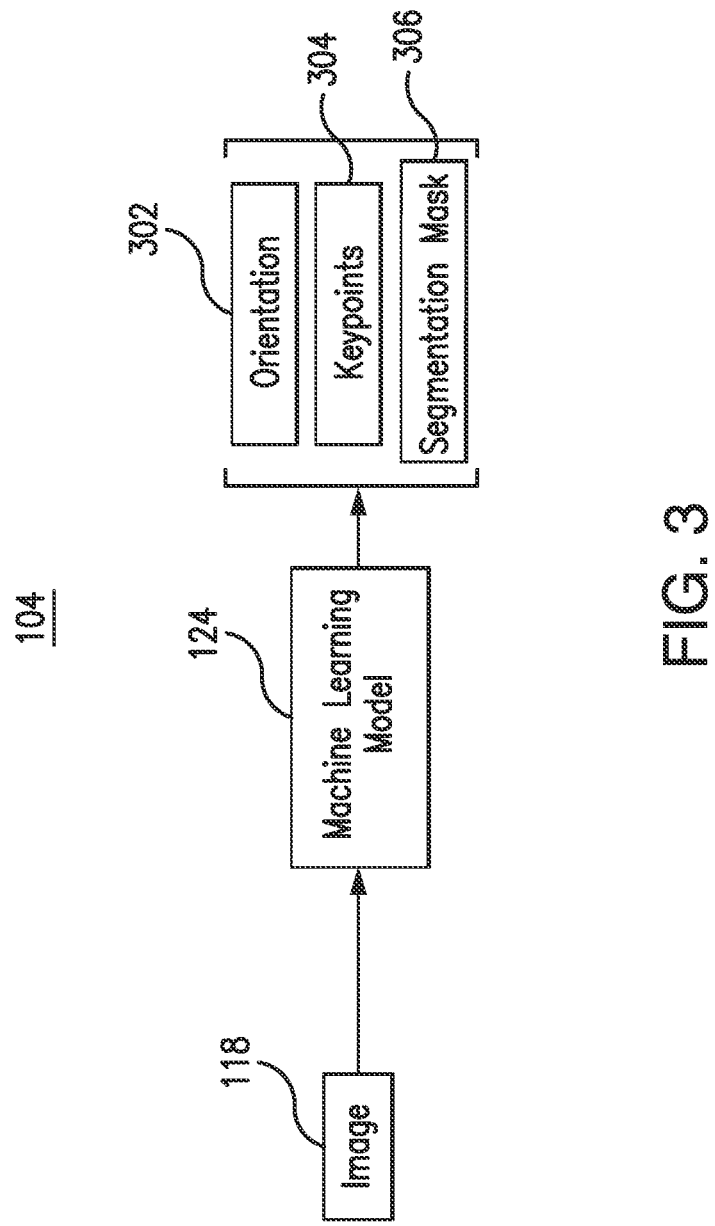
FIG. 3 illustrates an example device in the system of FIG. 1.

FIG. 3 illustrates an example device in the system of FIG. 1. As seen in FIG. 3, the device 104 uses the machine learning model 124 to predict certain features of the user's 102 foot in the image 118.

For example, the machine learning model 124 may predict an orientation 302 of the foot in the image 118. The machine learning model 124 may analyze portions of the boundary of the foot to predict an orientation of the foot in the image 118. The machine learning model 124 may analyze portions of the foot to determine if the foot is oriented at an angle relative to a particular axis in space in the image 118. For example, by analyzing a left and right boundary of the foot in the image 118, the machine learning model 124 may generate the prediction that the foot is turned towards the left or the right in the image 118.

As another example, the machine learning model 124 may predict one or more keypoints 304 on the foot in the image 118. The machine learning model 124 analyzes the boundary of the user's 102 foot to predict coordinates of key or important portions of the user's 102 foot. For example, the machine learning model 124 may predict the coordinates of each of the user's 102 toes and coordinates for the user's 102 heel and ankle. As another example, the machine learning model 124 may predict the coordinates of the protrusion of the first metatarsophalangeal joint and the protrusion of the fifth metatarsophalangeal joint.

In some embodiments, the machine learning model 124 may not be able to predict some or all of the keypoints 304. For example, the image 118 may be blurry or the foot in the image 118 may be oriented in a direction that makes it difficult for the machine learning model 124 to predict one or more of the keypoints 304. In these instances, these keypoints 304 may be missing. The machine learning model 124 may instead determine a boundary of the foot in the image 118 and produce a bounding box according to this boundary. In this manner, the machine learning model 124 approximates a boundary for the foot even though the machine learning model 124 does not predict the locations of keypoints 304 on the foot.

As another example, the machine learning model 124 may predict portions of the foot that will be occluded by other objects in the image 118 (e.g., the user's 102 leg or pants). The machine learning model 124 then generates a segmentation mask 306 that indicates the occluded portions. The machine learning model 124 analyzes the boundary of the foot and the boundary of the user's 102 leg in the image 118 to predict portions of the foot that will be occluded by the user's 102 leg (or another object in the image 118 such as clothing on the user's 102 leg). For example, the machine learning model 124 may analyze the boundary of the user's 102 foot and the boundary of the user's 102 leg to determine points along the user's 102 leg that will cover a portion of the user's 102 foot when viewed from the perspective of the image 118. The machine learning model 124 then predicts the coordinates along the user's 102 foot that will be occluded by the user's 102 leg. The machine learning model 124 or the device 104 then generate the segmentation mask 306 that indicates the coordinates of the occluded portions.

Figure 4A:
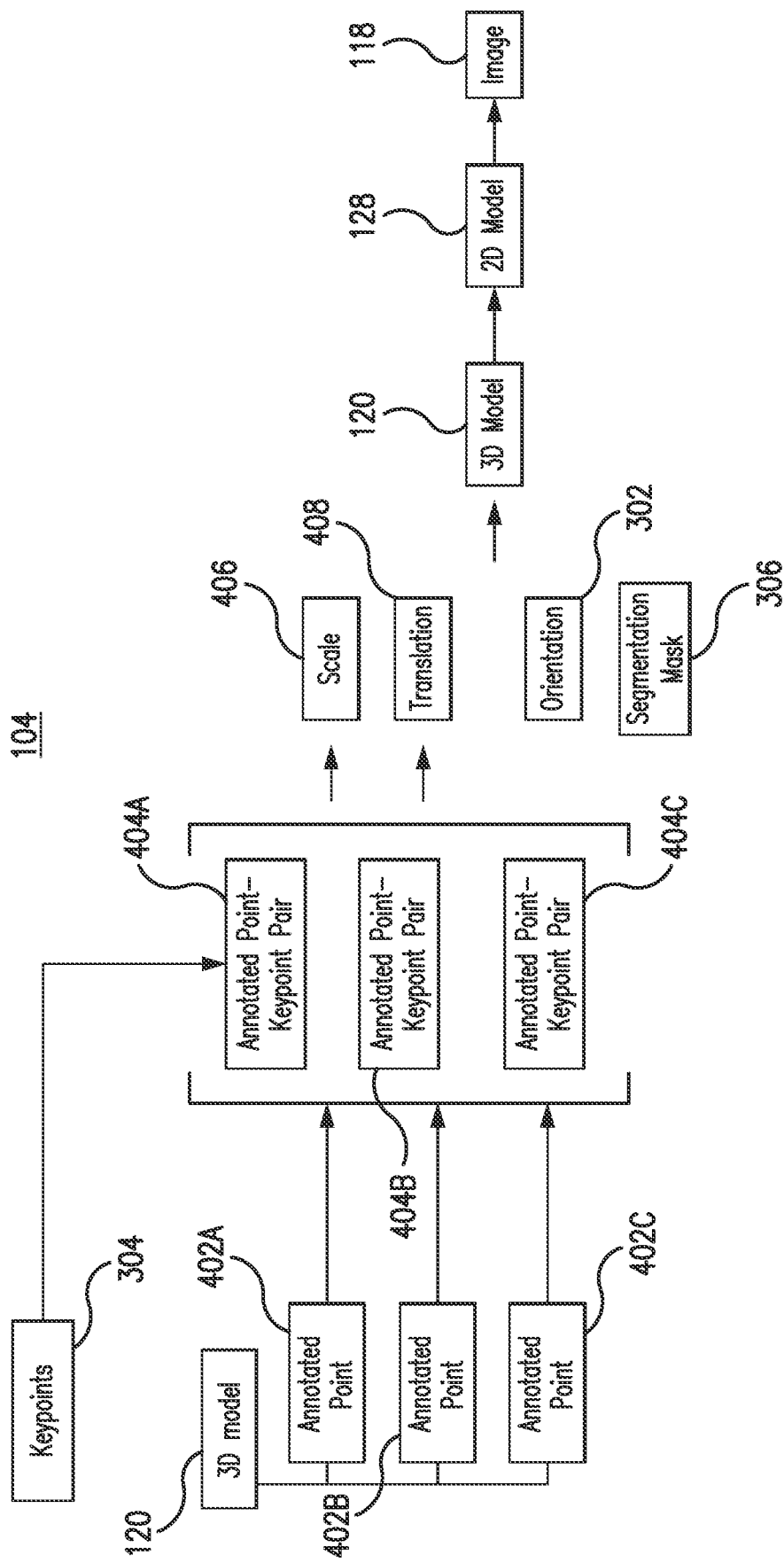
FIG. 4A illustrates an example device in the system of FIG. 1.

FIG. 4A illustrates an example device 104 in the system 100 of FIG. 1. Generally, FIG. 4A shows the device 104 generating the 2D model 128 from the 3D model 120 when the keypoints 304 are available. The device 104 uses the keypoints 304 as reference points to properly scale and position the 3D model 120 even when the 3D model 120 does not conform to a uniform or standard coordinate system. In this manner, the device 104 improves the simulated look and fit of the shoe on the user's foot, which improves user satisfaction and reduces material waste caused by returns, in particular embodiments.

The keypoints 304 may have been predicted by the machine learning model, and may include coordinates of certain structures or positions on the user's foot. For example, the machine learning model may predict the coordinates of each of the user's toes and coordinates for the user's heel and ankle. As another example, the machine learning model may predict the coordinates of the protrusion of the first metatarsophalangeal joint and the protrusion of the fifth metatarsophalangeal joint.

The device 104 uses the keypoints 304 to scale and position the 3D model 120 of the shoe. As seen in FIG. 4A, the 3D model 120 may include annotated points 402. The 3D model 120 may include any suitable number of annotated points 402. In the example of FIG. 4A, the 3D model 120 includes the annotated points 402A, 402B, and 402C. The annotated points 402A, 402B and 402C may have been annotated by a creator of the 3D model 120, such as a shoe provider or modeler. The annotated points 402A, 402B, and 402C may be provided at particular locations on the shoe. For example, the annotated points 402A, 402B, and 402C may include a point on the heel of the insole of the shoe, another point on the insole that would contact the protrusion of the first metatarsophalangeal joint of a foot (e.g., the protrusion on the side of the foot at the base of the big toe), and another point on the insole that would contact the protrusion of the fifth metatarsophalangeal joint of the foot (e.g., the protrusion on the side of the foot at the base of the little toe).

The device 104 scales and translates the 3D model 120 so that the annotated points 402 align with corresponding keypoints 304 on the foot. In the example of FIG. 4A, the device 104 pairs the annotated points 402A, 402B, and 402C with corresponding keypoints 304. The device 104 generates annotated point-keypoint pairs 404A, 404B, and 404C. The annotated point-keypoint pair 404A is a pairing of the annotated point 402A with a corresponding keypoint 304. For example, if the annotated point 402A is located at the heel on the insole of the shoe, then the device 104 pairs the annotated point 402A with the keypoint 304 located at the heel of the foot. The annotated point-keypoint pair 404B is a pairing of the annotated point 402B with a keypoint 304. For example, if the annotated point 402B is located at a point on the insole of the shoe that contacts the protrusion of the first metatarsophalangeal joint, then the device 104 pairs the annotated point 402B with the keypoint 304 located at the protrusion of the first metatarsophalangeal joint on the foot. The annotated point-keypoint pair 404C is a pairing of the annotated point 402C with a keypoint 304. If the annotated point 402C is located at a point on the insole that contacts the fifth metatarsophalangeal joint, then the device 104 pairs the annotated point 402C with the keypoint 304 located at the fifth metatarsophalangeal joint on the foot. In some embodiments, when the device 104 forms an annotated point-keypoint pair 404, the device 104 merely identifies an annotated point 402 and a keypoint 304 as corresponding to each other. The device 104 does not necessarily form a new structure (e.g., data structure) or object.

The device 104 then determines a scale 406 and a translation 408 using the annotated point-keypoint pairs 404. For example, the device 104 may determine a scale 406 and a translation 408 that, when applied to the 3D model 120, would align the annotated point 402 and the keypoint 304 that form each of the annotated point-keypoint pairs 404. In some embodiments, the device 104 may determine the scale 406 and the translation 408 that, when applied to the 3D model 120, would bring each of the annotated points 402 closer to their corresponding keypoints 304 such that distances between the annotated points 402 and their corresponding keypoints 304 are reduced to within a threshold distance. As an example, the device 104 may determine a scale 406 that increases the size of the 3D model 120. Additionally, the device 104 may determine a translation 408 that shifts the 3D model 120 a certain direction in a coordinate space. The device 104 then applies the scale 406 and the translation 408 to the 3D model 120 so that the annotated points 402A, 402B, and 402C align with their corresponding keypoints 304 in the annotated point-keypoint pairs 404.

In a first approach, the device 104 uses orthographic projection. Let $\{p_i\}_i$ be a collection of 3D points whose 2D projections are $\{p_x^i, p_y^i\}_i$. The camera rotation $(r_x, r_y, r_z)$ is assumed known while the scale s and translation (t x, t y) are to be estimated. From the projection model, a first set of equations is:

$$p_x^i = s r_x^T p_i + t_x,$$

$$p_y^i = s r_y^T p_i + t_y.$$

These equations may be written in matrix-vector form:

$$\begin{bmatrix} \vdots \\ r_x^T p_i & 1 & 0 \\ r_y^T p_i & 0 & 1 \\ \vdots \end{bmatrix}$$

which is a linear least-squared problem and can be solved using singular value decomposition or QR factorization.

Let p=(x,y,z). The rotation may be fixed to identity and the point may have unit depth under camera coordinates. Let (s',t$_x$',t$_y$') be the parameter for the perspective camera. From the perspective projection model, a second set of equations is:

$$p_x = f(s'x + t_x') + c_x,$$

$$p_y = f(s'y + t_y') + c_y.$$

By equating the first set of equations with the second set of equations:

$$s' = \frac{s}{f},\ t_x' = \frac{t_x - c_x}{f},\ t_y' = \frac{t_y - c_y}{f}.$$

In a second approach, the device 104 uses perspective projection and/or direct linear transformation. From the perspective projection equation:

$$p_x^i = f_x \frac{s r_x^T p_i + t_x}{s r_z^T p_i + t_z} + c_x.$$

This equation may be rewritten as $$\frac{p_x^i - c_x}{f_x} = \frac{s r_x^T p_i + t_x}{s r_z^T p_i + t_z},$$

and by defining $$\widetilde{p_x^i} = \frac{p_x^i - c_x}{f_x},$$

results in $$\widetilde{p_x^i}(s r_z^T p_i + t_z) = s r_x^T p_i + t_x,$$

which, by regrouping the terms results in the following homogeneous equation:

$$[\widetilde{p^t_x}(r_z^T p_i)-(r_x p_i)]s-t_x+\widetilde{p^t_x}t_z=0.$$

Similarly, for the y component:

$$[\widetilde{p^t_x}(r_z^T p_i)-(r_y^T p_i)]s-t_y+\widetilde{p^t_x}t_z=0.$$

These equations can be written in matrix-vector form:

$$\begin{bmatrix} \vdots \\ \widetilde{v_x^i}(r_z^T p_i) - (r_x^T p_i) & -1 & 0 & \widetilde{v_x^i} \\ \widetilde{v_y^i}(r_z^T p_i) - (r_y^T p_i) & 0 & -1 & \widetilde{v_y^i} \\ \vdots \end{bmatrix}\begin{pmatrix} s \\ t_x \\ t_y \\ t_z \end{pmatrix}=\begin{pmatrix} \vdots \\ 0 \\ 0 \\ \vdots \end{pmatrix},$$

which can be solved using singular value decomposition. In practice, the power method may be used to determine the smallest singular value and the associated singular vector. The solution is up to scale as the equations are homogeneous, so they may be normalized by forcing $t_z=1$ (e.g., by dividing by the last component).

The direct linear transformation may not provide accurate estimation because it minimizes algebraic errors rather than geometric errors. To improve accuracy, nonlinear least squares may be used with direct linear transformation as an initialization (e.g., the Levenberg Marquadt algorithm).

After the device 104 applies the scale 406 and the translation 408 to the 3D model 120, the device 104 applies the predicted orientation 302 and the segmentation mask 306 to the 3D model 120. For example, the device 104 may rotate the 3D model 120 so that the 3D model 120 aligns with the predicted orientation 302 of the foot. Additionally, the device 104 may remove portions of the 3D model 120 indicated by the segmentation mask 306. By removing these portions of the 3D model 120, the device 104 may simulate these portions of the 3D model 120 being occluded by other objects in the image (e.g. the user's leg or pants).

After the scale 406, the translation 408, the orientation 302 and the segmentation mask 306 have been applied to the 3D model 120, the device 104 generates the 2D model 128 using the 3D model 120. For example, the device 104 may flatten the 3D model 120 to generate the 2D model 128. In this manner, the device 104 projects the 3D model 120 onto a 2D plane. After the device 104 generates the 2D model 128, the device 104 superimposes the 2D model 128 onto the image 118. In this manner, the device 104 simulates the look and fit of the desired shoe on the foot of the user. The user may then view the image 118 with the superimposed 2D model 128 to determine whether the user wishes to purchase the shoe. In this manner, the device 104 improves user satisfaction and reduces material waste caused by returns, in certain embodiments.

Figure 4B:
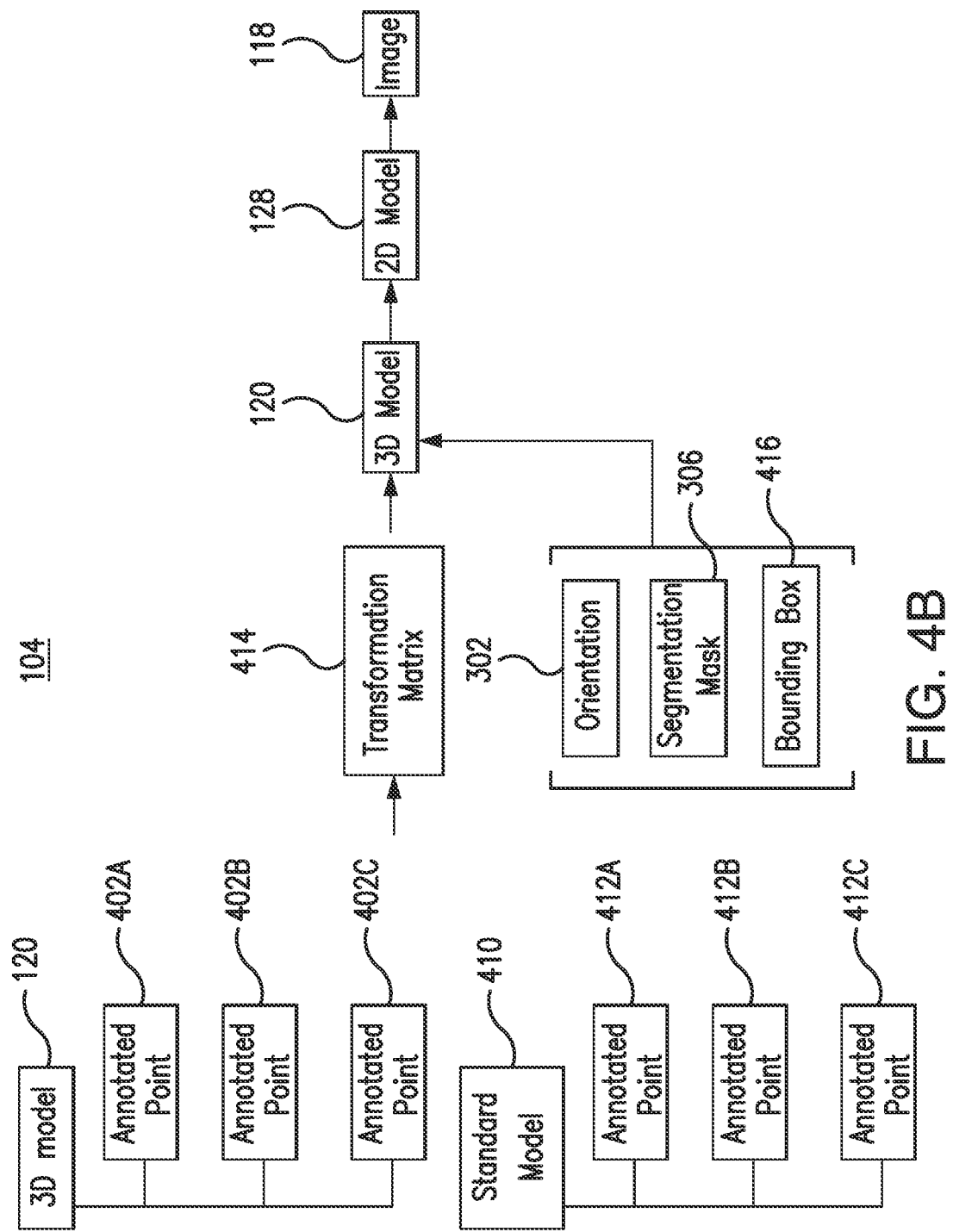
FIG. 4B illustrates an example device in the system of FIG. 1.

FIG. 4B illustrates an example device 104 in the system 100 of FIG. 1. Generally, FIG. 4B shows how the device 104 generates the 2D model 128 from the 3D model 120, when one or more keypoints from the machine learning model are not available. The device 104 standardizes the 3D model 120 according to a standard model 410 of a shoe before applying the predictions generated by the machine learning model to the 3D model 120.

As seen in FIG. 4B, the 3D model 120 is accompanied by annotated points 402. As with the previous examples, the 3D model 120 may include any suitable number of annotated points 402. In the example of FIG. 4B, the 3D model 120 includes the annotated points 402A, 402B, and 402C. The annotated points 402A, 402B, and 402C may be provided at particular locations on the shoe. For example, the annotated points 402A, 402B, and 402C may include a point on the heel of the insole of the shoe, another point on the insole that would contact the protrusion of the first metatarsophalangeal joint of a foot (e.g., the protrusion on the side of the foot at the base of the big toe), and another point on the insole that would contact the protrusion of the fifth metatarsophalangeal joint of the foot (e.g., the protrusion on the side of the foot at the base of the little toe).

The device 104 may recognize that one or more of the keypoints from the machine learning model are not available. For example, one or more of the keypoints may not have been predicted by the machine learning model due to the orientation of the foot in the image or the quality of the image. When the device 104 determines that one or more of the keypoints are not available, the device 104 standardizes the 3D model 120 according to a standard model 410 of a shoe. For example, the standard model 410 may be a model of a standard sized shoe (e.g., size 9) at a standard position and orientation. In the example of FIG. 4B, the standard model 410 may include annotated points 412 that were annotated when the standard model 410 was created. The annotated points 412 may be positioned at the same or similar locations of the shoe as the annotated points 402 of the 3D model 120. For example, the annotated point 412A may be positioned at the heel of the insole of the standard model 410. The annotated point 412B may be located at a position on the insole of the standard model 410 that contacts the protrusion of the first metatarsophalangeal joint. The annotated point 412C may be located at a position on the insole of the standard model 410 that contacts the protrusion of the fifth metatarsophalangeal joint.

The device 104 determines a transformation matrix 414 that when applied to the 3D model 120 aligns the annotated points 402 with the corresponding annotated points 412 in the standard model 410. The transformation matrix 414 may indicate a transformation in three dimensional space. For example, the transformation matrix 414 may include values that indicate a rotation, a scale, and a translation in three dimensional space. When the device 104 applies the transformation matrix 414 to the 3D model 120, the 3D model 120 may be transformed such that the annotated points 402 align with their corresponding annotated points 412 in the standard model 410.

The device 104 may determine the transformation matrix 414 in any suitable manner. For example, the device 104 may compare the annotated points 402 with their corresponding annotated points 412 to determine the values in the transformation matrix 414. The annotated points 402 and the annotated points 412 may include coordinates in a three-dimensional space. The device 104 may determine differences between the coordinates of the annotated points 402 and their corresponding annotated points 412 to determine how to rotate, scale, or translate the 3D model 120 so that the annotated points 402 align with the annotated points 412 in the three-dimensional space.

After the device 104 applies the transformation matrix 414 to the 3D model 120, the 3D model 120 may be standardized. Stated differently, the 3D model 120 may be sized and positioned consistent with the standard model 410. The device 104 then applies the predictions of the machine learning model to the 3D model 120. For example, the device 104 may rotate the 3D model 120 so that the 3D model 120 aligns with the predicted orientation 302 of the foot in the image. As another example, the device 104 may scale the 3D model 120 so that the 3D model 120 fits within a predicated bounding box 416 for the foot in the image. The bounding box 416 may have been predicted by the machine learning model as an alternative to predicting keypoints on the foot. For example, the machine learning model may have predicted the bounding box 416 by determining the boundaries of the foot in the image. The device 104 may scale the 3D model 120 so that the 3D model 120 fits within and does not intersect with the bounding box 416. As yet another example, the device 104 may remove portions of the 3D model 120 according to the segmentation mask 306. For example, the device 104 may remove portions of the 3D model 120 that the segmentation mask 306 indicates will be occluded by other objects in the image (e.g., the user's leg or pants).

The device 104 then generates the 2D model 128 using the 3D model 120. For example, the device 104 may flatten the 3D model 120 to generate the 2D model 128. In this manner, the device 104 projects the 3D model 120 onto a 2D plane. After generating the 2D model 128, the device 104 superimposes the 2D model 128 onto the image 118 to simulate the look and fit of the shoe on the user's foot. In this manner, the device 104 generates the 2D model 128 of the shoe, even when the 3D model 120 did not conform to a standard or uniform coordinate system when the 3D model 120 was generated. As a result, the device 104 improves the accuracy of the simulated look and fit of the shoe on the user's foot, which improves user satisfaction and reduces material waste caused by returns, in certain embodiments.

Figure 5:
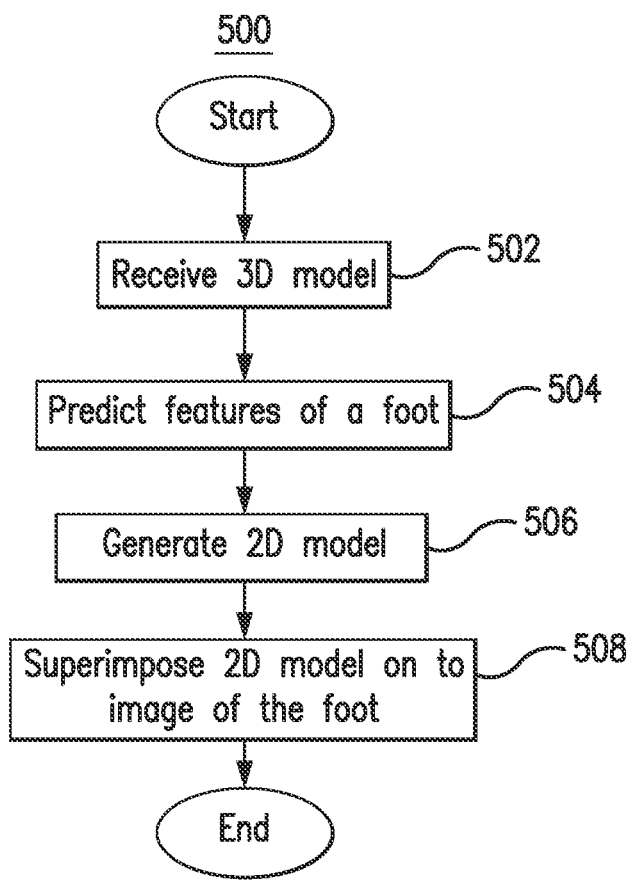
FIG. 5 is a flowchart of an example method performed in the system of FIG. 1.

FIG. 5 is a flowchart of an example method 500 performed in the system 100 of FIG. 1. In particular embodiments, the device 104 performs the method 500. By performing the method 500, the device 104 improves the accuracy of the simulated look and fit of a shoe on the user's foot, which improves user satisfaction and reduces material waste caused by returns.

In block 502, the device 104 receives a 3D model 120. The device 104 may have retrieved the 3D model 120 from a database 108 in response to a user 102 indicating that the user 102 wants to virtually try on a particular shoe. The device 104 may have issued a query to the database 108 to retrieve the 3D model 120 of the desired shoe. In response, the database 108 retrieves the 3D model 120 and communicates the 3D model 120 to the device 104. The 3D model 120 may include annotated points 402 on certain locations of the 3D model 120. For example, the annotated points 402 may be positioned on the insole of the shoe at the heel, on a point of the insole that would contact the protrusion of the first metatarsophalangeal joint of a foot, and on a point of the insole that would contact the protrusion of the fifth metatarsophalangeal joint of the foot. The shoe provider or modeler may have designated the annotated points 402 when the 3D model 120 was created.

In block 504, the device 104 predicts certain features of a foot in an image 118. The device 104 may have captured the image 118 of the foot when the user 102 directed the camera 114 of the device 104 at the user's 102 foot. The device 104 then uses a machine learning model 124 to analyze the image 118 of the foot. The machine learning model 124 predicts one or more features of the foot by analyzing the image 118. For example, the machine learning model 124 may predict an orientation 302 of the foot in a three dimensional space. As another example, the machine learning model 124 may predict one or more keypoints 304 that indicate the coordinates of important or key structures on the foot. The keypoints 304 may include keypoints 304 on the heel of the foot, on the protrusion of the first metatarsophalangeal joint on the foot, and on the protrusion of the fifth metatarsophalangeal on the foot. In some embodiments, the machine learning model 124 may not predict the one or more keypoints 304 due to the orientation of the foot in the image 118 or the quality of the image 118. As yet another example, the machine learning model 124 may predict portions of the foot that will be occluded by other objects in the image 118 (e.g., the user's leg or pants).

In block 506, the device 104 generates a 2D model 128 of the shoe. The device 104 may generate the 2D model 128 in any suitable manner. In a first example process, the device 104 first scales and translates the 3D model 120, according to one or more predicted keypoints 304. The device 104 may pair the annotated points 402 on the 3D model 120 with corresponding keypoints 304 to form annotated point-keypoint pairs 404. For example, the device 104 may pair an annotated point 402 at the heel of the insole of the 3D model 120 with the keypoint 304 on the heel of the foot, the annotated point 402B at the point on the insole of the 3D model 120 that contacts the protrusion of the first metatarsophalangeal joint with the keypoint 304 at the protrusion of the first metatarsophalangeal joint of the foot, and the annotated point 402C at the point on the insole of the 3D model 120 that contacts the protrusion of the fifth metatarsophalangeal joint with the keypoint 304 at the fifth metatarsophalangeal joint of the foot.

The device 104 then determines a scale 406 and a translation 408 by analyzing the differences between the annotated point 402 and the keypoint 304 in each annotated point-keypoint pair 404. For example, the device 104 may determine a difference between the annotated point 402 and the keypoint 304 in each annotated point-keypoint pair 404 and determine the scale 406 and the translation 408 that will minimize or eliminate these differences. The device 104 then applies the scale 406 and the translation 408 to the 3D model 120 to align the annotated points 402 on the 3D model 120 with the predicted keypoints 304. The device 104 then rotates the 3D model 120 so that the 3D model 120 aligns with the predicated orientation 302 of the foot. The device 104 then removes portions of the 3D model 120 indicated by the segmentation mask 306 that indicates the portions of the foot that will be occluded by other objects in the image 118. The device 104 then generates the 2D model 128 by flattening the 3D model 120.

In a second example process, the device 104 generates the 2D model 128 from the 3D model 120 when one or more keypoints 304 from the machine learning model are not available. In this process, the device 104 determines a transformation matrix 414 that, when applied to the 3D model 120, aligns the annotated points 402 included with the 3D model 120 with annotated points 412 of a standard model 410. The standard model 410 may be a model of a shoe at a standard size (e.g., size 9) and at a standard position. The device 104 may determine differences between the annotated points 402 and their corresponding annotated points 412 in the standard model 410. The device 104 then determines values for the transformation matrix 414 that reduce or eliminate these differences. For example, the transformation matrix 414 may include values that indicate a rotation, scale, and translation. After the transformation matrix 414 is determined, the device 104 applies the transformation matrix to the 3D model 120 to rotate, scale, and translate the 3D model 120 so that the 3D model 120 conforms to the standard model 410.

The device 104 then rotates the 3D model 120 so that the 3D model 120 aligns with the predicted orientation 302 of the foot in the image 118. The device 104 also scales the 3D model 120 so that the 3D model 120 fits within a predicted bounding box 416 for the foot in the image 118. The device 104 may also remove portions of the 3D model 120 indicated by the segmentation mask 306. The device 104 then flattens the 3D model 120 to produce the 2D model 128.

In block 508, the device 104 superimposes the 2D model 128 onto the image 118 of the foot. In this manner, the device 104 simulates the look and fit of the shoe on the foot in the image 118. In certain embodiments, by using the annotated points 402 included with the 3D model 120 as reference points, the device 104 improves the accuracy of the simulated look and fit of the shoe, which improves user satisfaction and reduces material waste caused by returns.

Figure 6:
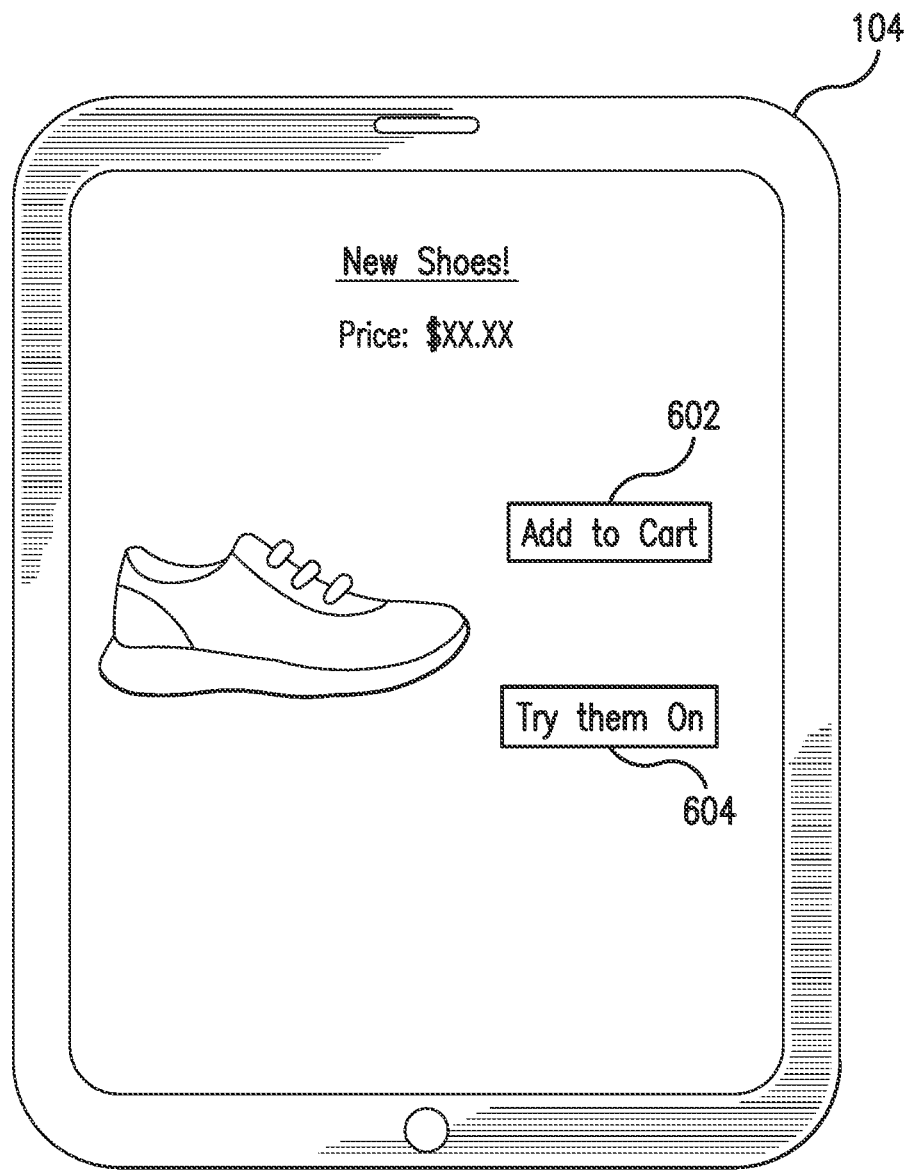
FIG. 6 illustrates an example device in the system of FIG. 1.

FIG. 6 illustrates an example device 104 in the system 100 of FIG. 1. As seen in FIG. 6, the device 104 is being used to shop for shoes online. The device 104 shows a product listing for a shoe. The listing includes an image of the shoe along with a price for the shoe. Additionally, the device 104 presents a button 602 and a button 604. If the button 602 is activated or pressed by a user 102, the device 104 communicates a message requesting that the shoe be added to a virtual shopping cart of the user 102. The user 102 may then checkout and purchase the shoe.

If the user 102 activates or presses the button 604, the device 104 may begin the virtual shoe try-on process to simulate the look and fit of the shoe on the user's 102 foot. By providing this feature, the device 104 allows the user 102 to see how the shoe looks on the user's 102 foot before the user 102 commits to purchasing the shoe. In this manner, the device 104 reduces the likelihood that the user 102 will be dissatisfied with the shoe purchase and the likelihood that the user 102 will return the shoe. As a result, the device 104 improves the satisfaction of the user 102 and conserves shipping resources, such as packaging materials and fuel, in particular embodiments.

Figure 7:
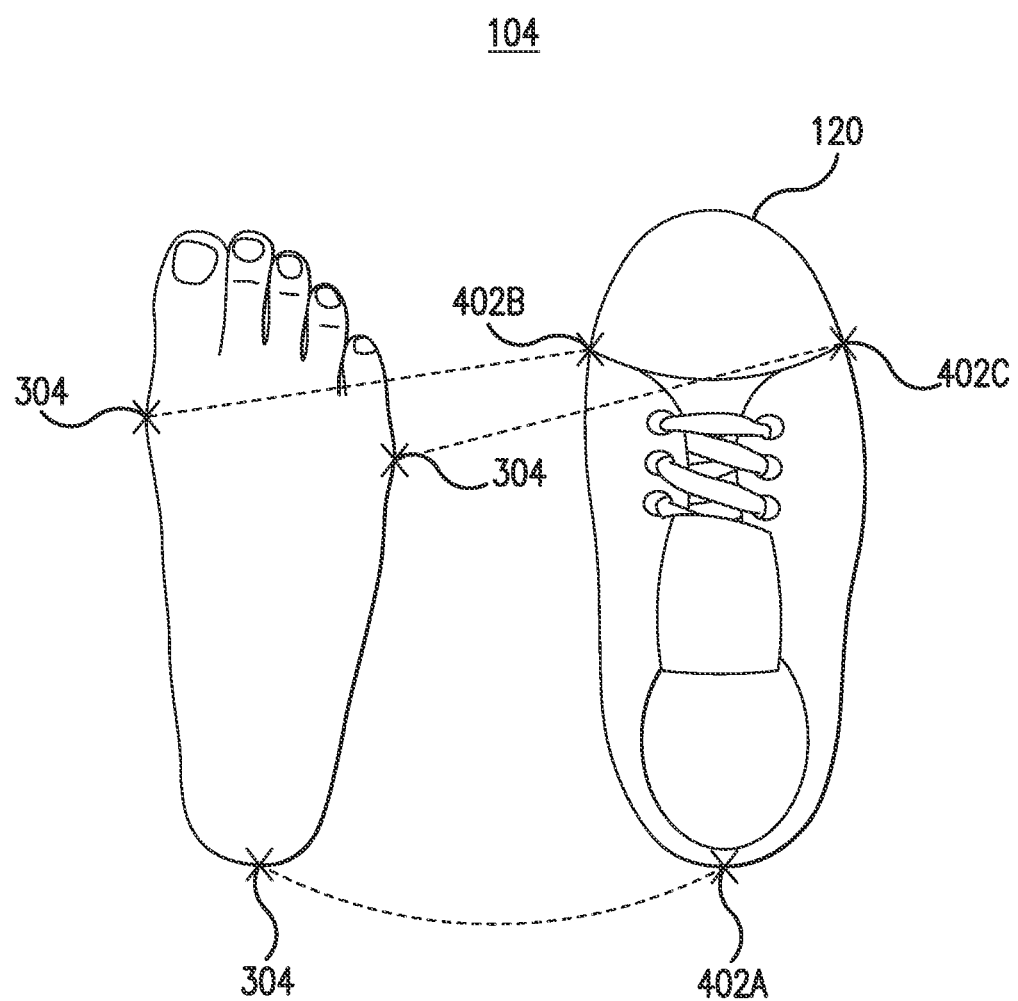
FIG. 7 illustrates an example device in the system of FIG. 1.

FIG. 7 illustrates an example device 104 in the system 100 of FIG. 1. As seen in FIG. 7, the device 104 pairs one or more annotated points 402 on the 3D model 120 with one or more keypoints 304 on a foot. In the example of FIG. 7, the 3D model 120 includes an annotated point 402A, an annotated point 402B, and an annotated point 402C. The annotated point 402A is positioned at a heel of the insole of the shoe. The annotated point 402B is located at a position on the insole that contacts the protrusion of the first metatarsophalangeal joint. The annotated point 402C is located at a position on the insole that contacts the fifth metatarsophalangeal joint.

The device 104 pairs the annotated points 402 with corresponding keypoints 304 on the foot. As seen in FIG. 7, the device 104 pairs the annotated point 402A with a keypoint 304 at the heel of the foot. The device 104 pairs the annotated point 402B with a keypoint 304 at the protrusion of the first metatarsophalangeal joint on the foot. The device 104 pairs the annotated point 402C with a keypoint 304 at the protrusion of the fifth metatarsophalangeal joint of the foot. As discussed previously, the device 104 may then scale and translate the 3D model 120 so that the annotated points 402A, 402B, and 402C align with their paired keypoints 304. The device 104 may then rotate and segment certain portions of the 3D model 120. The device 104 then generates the 2D model 128 by flattening the 3D model 120.

Figure 8:
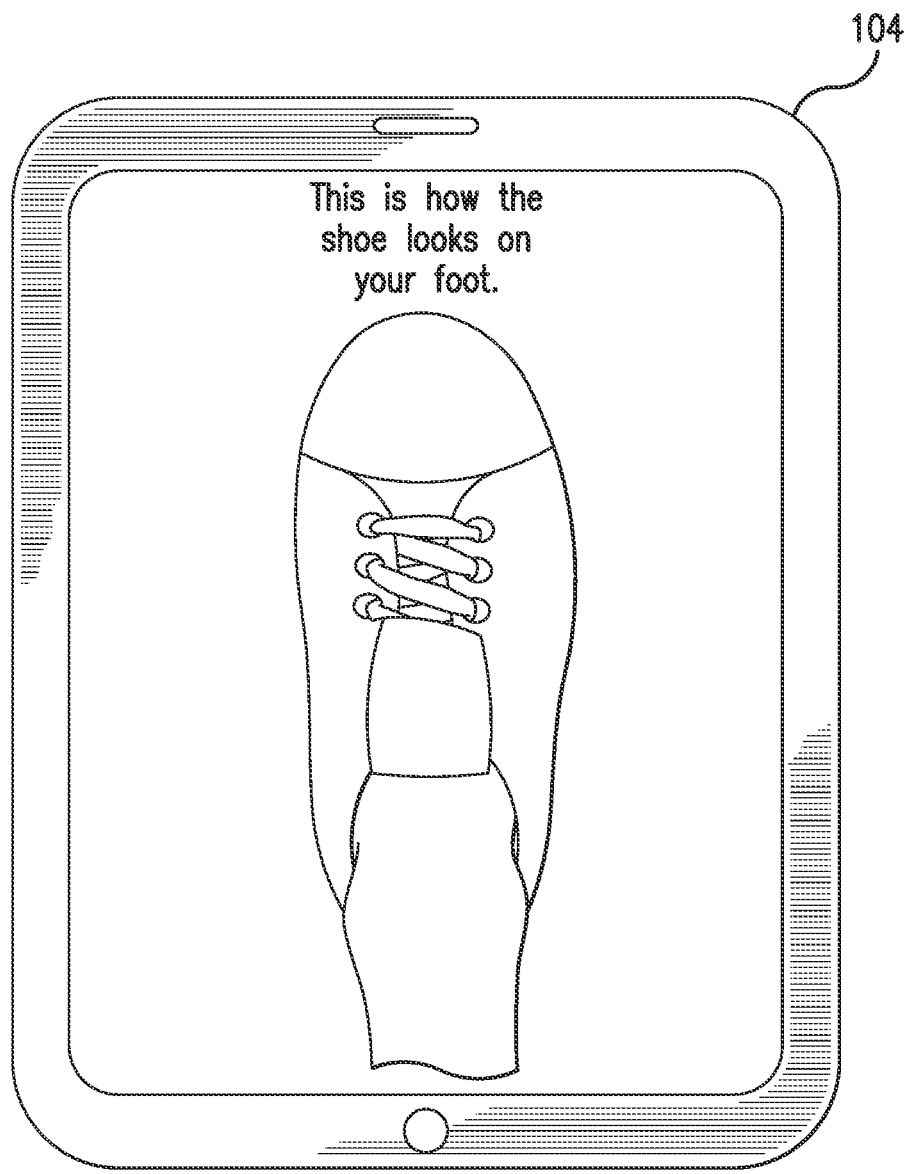
FIG. 8 illustrates an example device in the system of FIG. 1.

FIG. 8 illustrates an example device 104 in the system 100 of FIG. 1. As seen in FIG. 8, the device 104 has processed the image of the user's foot and the 3D model of the shoe. The device 104 has generated a 2D model of the shoe and superimposed the 2D model of the shoe onto the image of the user's foot. The device 104 then presents an image showing the 2D model of the shoe superimposed onto the user's foot. In some embodiments, the image is a real-time image of the foot, and the device 104 superimposes the 2D model of the shoe onto the real-time image of the foot. When the user views the device 104, the user sees how the shoe looks and fits on the user's foot. The user may then evaluate whether the user wants to purchase the shoe.

In summary, when 3D models 120 are generated, the creator of the 3D models 120 annotates several points 402 on the 3D models 120. For example, the creator may annotate a point 402 on the heel of the insole of the shoe, another point 402 on the insole that would contact the protrusion of the first metatarsophalangeal joint of a foot (e.g., the protrusion on the side of the foot at the base of the big toe), and another point 402 on the insole that would contact the protrusion of the fifth metatarsophalangeal joint of the foot (e.g., the protrusion on the side of the foot at the base of the little toe). These annotated points 402 are then used to scale and translate the 3D model 120.

In a first process, the annotated points 402 on a 3D model 120 are considered with keypoints 304 on the foot. These keypoints 304 may have been predicted from an image 118 of the foot. The keypoints 304 may be positioned at the heel of the foot, at the protrusion of the first metatarsophalangeal joint, and at the protrusion of the fifth metatarsophalangeal joint. The 3D model 120 may be scaled and translated so that the annotated points 402 on the 3D model 120 align with the keypoints 304 on the foot. As a result, the 3D model 120 is sized to fit onto the foot, in certain embodiments.

In a second process, if the keypoints 304 for the foot are not available, then the 3D model 120 is processed (e.g., transformed) so that the annotated points 402 on the 3D model 120 align with annotated points 412 on a standard sized model 410 (e.g., a model of a size 9 shoe). In this manner, the 3D model 120 is aligned with a standard that is uniform across different shoes. The virtual shoe try-on feature then scales and orients the processed 3D model 120 to fit on the foot.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure describes a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A method for fitting a virtual shoe onto a foot, the method comprising:
   receiving, from a database, a three-dimensional model of a shoe, a first annotated point on the three-dimensional model of the shoe, a second annotated point on the three-dimensional model of the shoe, and a third annotated point on the three-dimensional model of the shoe;
   predicting, using a machine learning model and based on an image of a foot, a first point on the foot, a second point on the foot, and a third point on the foot;
   determine whether the first point, the second point, or the third point are available;
   in an instance in which at least one of the first point, the second point, or the third point are not available;
      predicting a transformation matrix based on the first annotated point, the second annotated point, the third annotated point, and a plurality of annotated points for a standard shoe model, and
      applying the transformation matrix to the three-dimensional model of the shoe to produce a transformed model of the shoe, wherein a two-dimensional model of the shoe is generated based on the transformed model of the shoe;
   in an instance in which the first point, the second point, and the third point are available:
      pairing the first annotated point with the first point to produce a first annotated point-first point pair, the second annotated point with the second point to produce a second annotated point-second point pair, and the third annotated point with the third point to produce a third annotated point-third point pair;
      determining a scale for the three-dimensional model of the shoe and a translation for the three-dimensional model of the shoe based on the first annotated point-first point pair, the second annotated point-second point pair, and the third annotated point-third point pair;
      applying the scale and the translation to the three-dimensional model of the shoe; and
      generating, a two-dimensional model of the shoe using the three-dimensional model of the shoe after applying the scale and translation to the three-dimensional model of the shoe; and
   superimposing the two-dimensional model of the shoe onto the image of the foot.

2. The method of claim 1, wherein the first annotated point is at a first location on an insole of the three-dimensional model of the shoe corresponding to a heel, the second annotated point is at a second location of the insole corresponding to a protrusion of a first metatarsophalangeal joint, and the third annotated point is at a third location of the insole corresponding to a protrusion of a second metatarsophalangeal joint.

3. The method of claim 1, further comprising:
   predicting, using the machine learning model and based on the image of the foot, a predicted orientation of the foot; and
   rotating the three-dimensional model of the shoe based on the predicted orientation.

4. The method of claim 1, wherein first point corresponds to a heel of the foot, the second point corresponds to a protrusion of a first metatarsophalangeal joint of the foot, and the third point corresponds to a protrusion of a second metatarsophalangeal joint of the foot.

5. A method comprising:
   receiving, from a database, a three-dimensional model of a shoe with a first annotated point on the three-dimensional model of the shoe, a second annotated point on the three-dimensional model of the shoe, and a third annotated point on the three-dimensional model of the shoe;
   predicting, using a machine learning model and based on an image of a foot, one or more features of the foot, wherein the one or more features comprise a first point on the foot, a second point on the foot, and a third point on the foot;
   determine whether at least one of the first point, the second point, or the third point are available;
   in an instance in which at least one of the first point, the second point, or the third point are not available:
      predicting a transformation matrix based on the first annotated point, the second annotated point, the third annotated point, and a plurality of annotated points for a standard shoe model, and
      applying the transformation matrix to the three-dimensional model of the shoe to produce a transformed model of the shoe, wherein a two-dimensional model of the shoe is generated based on the transformed model of the shoe;
   in an instance in which the first point, the second point, and the third point are available:
      generating, based on the first annotated point, the second annotated point, the third annotated point, and the one or more features, a two-dimensional model of the shoe using the three-dimensional model of the shoe, wherein the generating the two-dimensional model of the shoe comprises scaling and translating the three-dimensional model of the shoe based on the first annotated point, the second annotated point, the third annotated point, the first point, the second point, and the third point; and
   annotated point, the third annotated point, and a plurality of annotated points for a standard shoe;
   superimposing the two-dimensional model of the shoe onto the image of the foot.

6. The method of claim 5, wherein scaling and translating the three-dimensional model of the shoe comprises pairing the first annotated point with the first point to produce a first annotated point-first point pair, the second annotated point with the second point to produce a second annotated point-second point pair, and the third annotated point with the third point to produce a third annotated point-third point pair, wherein scaling the translating the three-dimensional model of the shoe is based on the first annotated point-first point pair, the second annotated point-second point pair, and the third annotated point-third point pair.

7. The method of claim 5, further comprising:
   predicting, using the machine learning model and based on the image of the foot, a predicted orientation of the foot; and
   rotating the three-dimensional model of the shoe based on the predicted orientation.

8. The method of claim 5, wherein first point corresponds to a heel of the foot, the second point corresponds to a protrusion of a first metatarsophalangeal joint of the foot, and the third point corresponds to a protrusion of a second metatarsophalangeal joint of the foot.

9. The method of claim 5, wherein scaling and translating the three-dimensional model of the shoe comprises adjusting a size and a position of the three-dimensional model of the shoe to reduce a first distance between the first annotated point and the first point, a second distance between the second annotated point and the second point, and a third distance between the third annotated point and the third point.

10. The method of claim 5, wherein the first annotated point is at a first location on an insole of the three-dimensional model of the shoe corresponding to a heel, the second annotated point is at a second location of the insole corresponding to a protrusion of a first metatarsophalangeal joint, and the third annotated point is at a third location of the insole corresponding to a protrusion of a second metatarsophalangeal joint.

11. A system comprising:
a memory; and
a processor communicatively coupled to the memory, the processor configured to:
receive, from a database, a three-dimensional model of a shoe with a first annotated point on the three-dimensional model of the shoe, a second annotated point on the three-dimensional model of the shoe, and a third annotated point on the three-dimensional model of the shoe;
predict, using a machine learning model and based on an image of a foot, one or more features of the foot, wherein the one or more features comprise a first point on the foot, a second point on the foot, and a third point on the foot;
determine whether at least one of the first point, the second point, or the third point are available;
in an instance in which at least one of the first point, the second point, or the third point are not available:
predict a transformation matrix based on the first annotated point, the second annotated point, the third annotated point, and a plurality of annotated points for a standard shoe model, and
apply the transformation matrix to the three-dimensional model of the shoe to produce a transformed model of the shoe, wherein a two-dimensional model of the shoe is generated based on the transformed model of the shoe;
in an instance in which the first point, the second point, and the third point are available:
generate, based on the first annotated point, the second annotated point, the third annotated point, and the one or more features, a two-dimensional model of the shoe using the three-dimensional model of the shoe, wherein the generating the two-dimensional model of the shoe comprises scaling and translating the three-dimensional model of the shoe based on the first annotated point, the second annotated point, the third annotated point, the first point, the second point, and the third point; and
superimpose the two-dimensional model of the shoe onto the image of the foot.

12. The system of claim 11, wherein scaling and translating the three-dimensional model of the shoe comprises pairing the first annotated point with the first point to produce a first annotated point-first point pair, the second annotated point with the second point to produce a second annotated point-second point pair, and the third annotated point with the third point to produce a third annotated point-third point pair, wherein scaling the translating the three-dimensional model of the shoe is based on the first annotated point-first point pair, the second annotated point-second point pair, and the third annotated point-third point pair.

13. The system of claim 11, wherein the processor is further configured to:
predict, using the machine learning model and based on the image of the foot, a predicted orientation of the foot; and
rotate the three-dimensional model of the shoe based on the predicted orientation.

14. The system of claim 11, wherein first point corresponds to a heel of the foot, the second point corresponds to a protrusion of a first metatarsophalangeal joint of the foot, and the third point corresponds to a protrusion of a second metatarsophalangeal joint of the foot.

15. The system of claim 11, wherein scaling and translating the three-dimensional model of the shoe comprises adjusting a size and a position of the three-dimensional model of the shoe to reduce a first distance between the first annotated point and the first point, a second distance between the second annotated point and the second point, and a third distance between the third annotated point and the third point.

16. The system of claim 11, wherein the first annotated point is at a first location on an insole of the three-dimensional model of the shoe corresponding to a heel, the second annotated point is at a second location of the insole corresponding to a protrusion of a first metatarsophalangeal joint, and the third annotated point is at a third location of the insole corresponding to a protrusion of a second metatarsophalangeal joint.

* * * * *